US008417858B2

(12) United States Patent
Steinmetz et al.

(10) Patent No.: US 8,417,858 B2
(45) Date of Patent: Apr. 9, 2013

(54) SYSTEM AND METHOD FOR ENABLING MULTIPLE PROCESSORS TO SHARE MULTIPLE SAS WIDE PORTS

(75) Inventors: Joseph Harold Steinmetz, Costa Mesa, CA (US); Murthy Kompella, Costa Mesa, CA (US); Narayan Rao Ayalasomayajula, Costa Mesa, CA (US); Larry Lomelino, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 195 days.

(21) Appl. No.: 12/116,803

(22) Filed: May 7, 2008

(65) Prior Publication Data

US 2009/0282175 A1    Nov. 12, 2009

(51) Int. Cl.
*G06F 3/00* (2006.01)
*G06F 5/00* (2006.01)

(52) U.S. Cl. ............................................ 710/74; 710/38

(58) Field of Classification Search .................... 710/38, 710/74
See application file for complete search history.

(56) References Cited

U.S. PATENT DOCUMENTS

| | | | | |
|---|---|---|---|---|
| 6,157,963 | A * | 12/2000 | Courtright et al. | 710/5 |
| 7,805,706 | B1 * | 9/2010 | Ly et al. | 717/121 |
| 2005/0015532 | A1 * | 1/2005 | Beckett et al. | 710/105 |
| 2007/0168598 | A1 * | 7/2007 | Yamamoto et al. | 711/100 |
| 2007/0220204 | A1 * | 9/2007 | Nakajima et al. | 711/114 |

* cited by examiner

*Primary Examiner* — Kris Rhu
(74) *Attorney, Agent, or Firm* — Morrison & Foerster LLP

(57) ABSTRACT

Embodiments of the present invention provide for an IOC that does not limit each CPU to a particular port. Instead, the IOC may allow each CPU to communicate with all ports. Thus, the IOC can process CPU communications to determine which port to send them to, and send them to the correct port as well as process incoming communications from the ports to determine which CPU to send them to and send these communications to the correct CPU. This may significantly increase the flexibility and efficiency of a storage network.

30 Claims, 6 Drawing Sheets

US 8,417,858 B2

SYSTEM AND METHOD FOR ENABLING MULTIPLE PROCESSORS TO SHARE MULTIPLE SAS WIDE PORTS

FIELD OF THE INVENTION

This invention relates to networking in general and, more specifically, to multi wide port input output controllers (IOCs) for Serial Attached SCSI (SAS) networks.

BACKGROUND OF THE INVENTION

Serial Attached SCSI, or SAS, is a well known networking protocol. It is primarily used for storage networks. Serial Advanced Technology Attachment (SATA) is another protocol used for similar purposes. For example, the SAS or SATA protocol can be used to connect various storage resources (e.g., hard drives) to a computer that is to control them (e.g., a RAID controller). The SAS protocol is capable of supporting SATA storage devices in addition to native SAS storage devices. Thus, the SAS protocol includes at least two different transport layer protocols—serial SCSI protocol (SSP) which supports native SAS storage devices, and the Serial ATA Tunneling Protocol (STP) which supports SATA storage devices that are connected to a SAS network.

A RAID controller is a computer or a computing device that is connected to a storage area network and to multiple (usually a large number) of storage devices. The RAID controller facilitates access to the storage devices for other computers connected to the storage area network. A RAID controller can include one or more CPUs for processing data requests as well an input output controller (IOC) that is used by the CPUs to access the storage devices. The IOC can include one or more ports. Each port may be connected to a storage device or a group of two or more storage devices. This connection may be realized, for example, using a SAS network. In existing systems, each CPU is usually limited to communicating with a single port and with the storage devices that are connected to it. This is usually very limiting and may cause significant inefficiencies. For example, if for some reason one set of storage devices connected to a single port is getting a majority of data requests, then the CPU associated with that port may be overloaded while other CPUs are idle.

SUMMARY OF THE INVENTION

Embodiments of the present invention provide for an IOC that does not limit each CPU to a particular port. Instead, the IOC may allow each CPU to communicate with all ports. Thus, the IOC can process CPU communications to determine which port to send them to, and send them to the correct port as well as process incoming communications from the ports to determine which CPU to send them to and send these communications to the correct CPU. This may significantly increase the flexibility and efficiency of a storage network.

DETAILED DESCRIPTION OF EXEMPLARY EMBODIMENTS

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described primarily in terms of RAID controllers and SAS networks it should be understood that the invention is not thus limited and its teachings can be applied to other types of networks.

Embodiments of the present invention provide for an IOC that does not limit each CPU to a particular port. Instead, the IOC may allow each CPU to communicate with all ports. Thus, the IOC can process CPU communications to determine which port to send them to, and process incoming communications from the ports to determine which CPU to send them to. This may significantly increase the flexibility and efficiency of a storage network.

Figure 1:
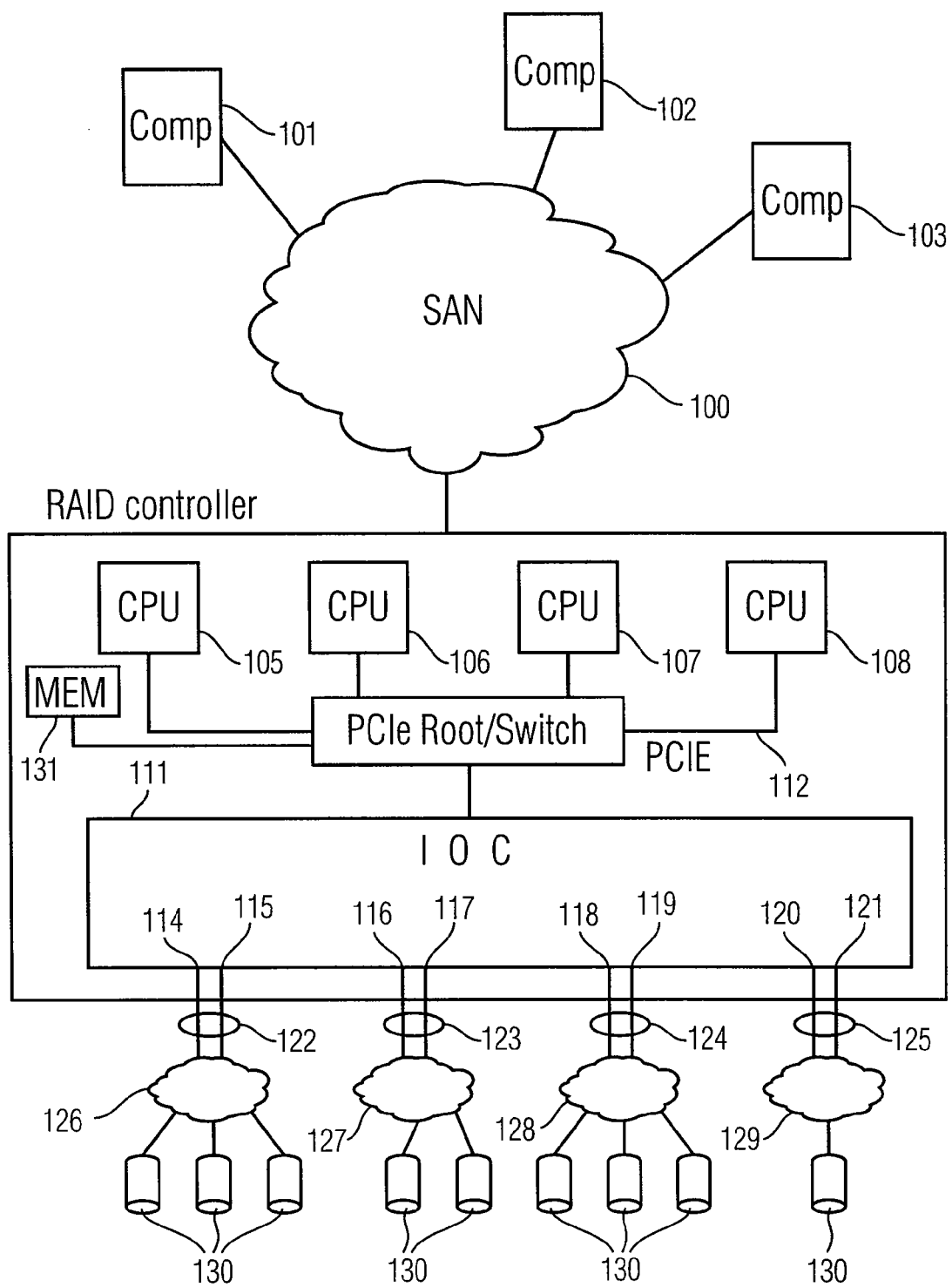
FIG. 1 is a diagram of an exemplary storage area network and RAID controller according to some embodiments of the invention.

FIG. 1 is a diagram of an exemplary storage network and RAID controller according to some embodiments of the invention. A storage area network (SAN) 100 can be connected to one or more computers 101-103. Computers 101-103 can be various computers that require networked storage, such as, for example, file servers, web servers, etc. While computers 101-103 may ordinarily be referred to as servers, in the present context they are clients, as they use storage services through the SAN 100. RAID controller 104 can also be connected to the storage area network. The RAID controller can provide the storage services for computers 101-103.

The RAID controller may include one or more CPUs. In the present case, four CPUs 105-108 are included. The CPUs can process requests for storage access received from the client computers 101-103 and execute the requests by accessing various storage devices. The CPUs are connected to an input output controller (IOC) 111, which facilitates communication between the CPUs and various storage devices. In some embodiments, multiple IOCs (not shown) can be used to connect the CPUs to different sets of storage devices. In some embodiments, another IOC (not shown) can connect the CPUs to the SAN 100. The CPUs can be connected to the IOC 111 (and any other IOCs that may be present) through a PCIe Root/Switch 112. In one example, the bus can be a PCIE bus, but it is not limited to PCIE buses. The bus can also connect to a memory 131. The memory may hold instructions which are to be executed at the CPUs, as well as data. The data may be, for example, data that is being processed for transmission between the computers 101-103 and various storage devices connected to the RAID controller (e.g., storage devices 131 discussed below). The data may also include various control and communication data necessary for communication with computers 101-103 and storage devices 130.

The input output controller can comprise a plurality of PHYs (114-121). A PHY refers to the electronics implementing the physical layer of a single network link. A PHY can also refer to the link itself (i.e., a single cable used for a network link). The IOC can also comprise one or more ports. A port is a logical connection between the IOC and a network of storage devices. Each port can comprise one or more single physical connections (i.e., one or more PHYs). In the present example, IOC 111 comprises four ports (122-125). Each port comprises two PHYs. Thus, for example, port 122 comprises PHYs 114 and 115. In some embodiments the ports of an IOC are reconfigurable. Thus, the IOC can be selectively reconfigured to use a different number of ports each comprising a different number of PHYs.

Each port can be connected to a storage device network which connects its respective port to one or more storage devices. Thus, storage device networks 126-129 can respectively connect ports 122-125 to various associated storage devices 130. Storage device networks 126-129 can be, for example, SAS networks. While these networks are shown as "clouds" in FIG. 1, they can comprise serial configurations as is often the case with SAS networks. Storage devices 130 can be hard drives or other types of storage devices. Storage devices 130 can be SAS enabled storage devices that communicate with their respective SAS networks through the SSP transport protocol, or they can be SATA devices that communicate with their respective SAS networks through the STP transport protocol. In some embodiments, the RAID controller 104, the storage device networks (or buses) 126-129 as well as the storage devices 130 can be considered part of a single device referred to as a Redundant Array of Inexpensive (or Independent) Disks (RAID).

In existing RAID controllers, each CPU is limited to communicating through each port. More specifically, each CPU is associated in bus 112 with a specific identifier (referred to as a function in the case of a PCIE bus) used for communication over the bus. An existing IOC pairs each function with a specific port and only allows communication between that function and the port. Thus, existing IOCs avoid some complexities of routing messages between different ports and CPUs. More specifically, messages originating from a particular CPU are only sent to a particular predefined port, and messages received at a predefined port are only sent to its associated CPU. As noted above, this arrangement is limiting and may result in inefficiencies.

Embodiments of the present invention allow for a CPU to access different ports and two or more CPUs to access the same port. This may require additional addressing of communications in order to determine which particular port they are associated with.

CPUs can communicate with the various storage devices in terms of input/output requests (also referred to as IO requests). An IO request can be a request to read data from a storage device or to write data to a storage device (in some cases, other requests, such as checking the status of a storage device may also be generated). An IO request can be followed by further communications, such as data to be saved, which is sent from the CPU to the storage device (also referred to as a target), a confirmation of saved data sent from the target to the CPU, or (if data is to be read), read data sent from the target to the requesting CPU. Thus, an IO request may initiate a transaction which may comprise one or more communications between the CPU and the target. The transaction may end when the IO request is fulfilled (i.e., all data requested to be read or saved is read or saved and all necessary confirmations are transmitted). A transaction may also be referred to as an IO.

It should be understood that when this disclosure refers to a CPU performing an action, it refers to the CPU performing the action as a result of software executed at the CPU. Software executed at the CPUs may be stored at the RAID controller memory 131. The software may comprise, for example, one or more storage drivers tasked with communicating with IOC 111. Each CPU may execute storage driver software concurrently. Therefore, multiple instances of the storage driver software can be simultaneously present (i.e., being executed) at the CPU (even if each CPU is executing the same driver software). Each such instance may be referred to in the description below as a separate driver.

Figure 2:
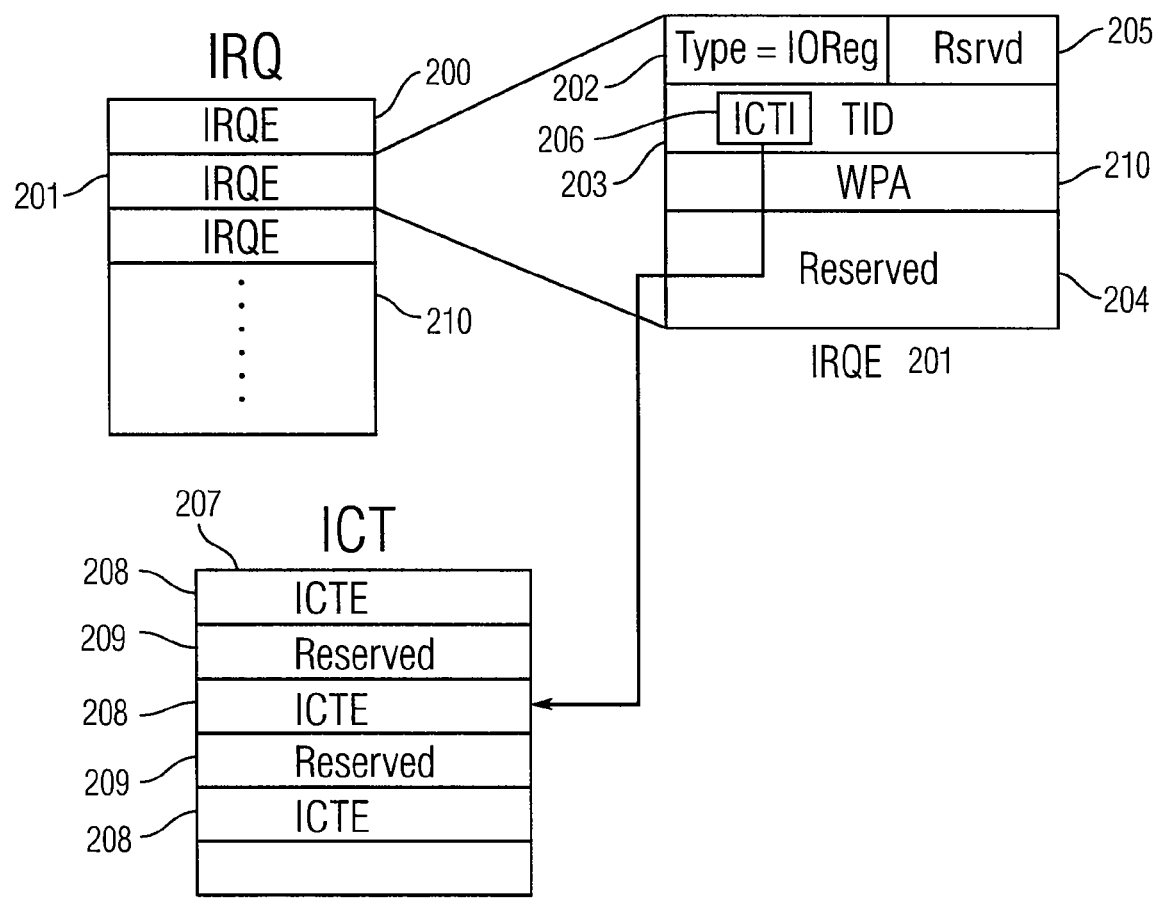
FIG. 2 is a diagram showing exemplary data entries that are associated with an exemplary I/O request according to some embodiments of the invention.

Transactions are associated with various data structures stored in the RAID controller memory 131. These data structures can be used to store various data associated with their respective associated transactions. FIG. 2 is a diagram showing exemplary data entries that may be stored for a transaction (or an IO request) in memory 131. IO request queue (IRQ) 200 is a queue that stores IO requests. It must be emphasized that, in the present disclosure, the term IRQ refers to a type of queue and not to an interrupt request. The IRQ may comprise one or more IRQ entries (IRQEs), such as IRQE 201. When a CPU needs to read or write some data to or from the storage devices, it may generate an IRQE describing a request to read or write data and enqueue the IRQE in the IRQ 200. The IOC can read the IRQEs from the IRQ and process them. Usually a different IRQ is used for each CPU.

IRQE 201 is examined in more detail, but its structure is similar to other IRQEs. An IRQE comprises a type field 202 that specifies that the IRQE is an entry for an IO Request. It also includes a transaction ID (TID) field. The TID field is intended to be a unique identifier for a particular transaction, thus differentiating it from other transactions that may be pending. The IRQE may also include reserved fields 205 and 204. The TID field 203 can include an IO context table index (ICTI) portion 203. The ICTI can reference an entry in an internal context table (ICT), such as internal context table 207. The ICTE also contains a Wide Port association (WPA) field 210 which indicates which of the possible ports the request must be transmitted to by the IOC. {This field also needs to be added in FIG. 2 after the TID field).

An ICT may be a table that is used to store the contexts associated with various transaction. A context is data associated with particular transaction. Thus, a transaction's context may include various settings for the transaction, parameters indicating the state of the transaction, as well as one or more buffers where data to be written to a storage device is stored. Also, a context may include buffers where data being read from the storage devices is stored. Thus, the IO context table 207 can include a plurality of IO context table entries (ICTEs), each ICTE comprising the context of an associated transaction (the associated transaction being the transaction whose TID includes a link to the ICTE). Thus, the ICTE may include various parameters indicating a state and configuration of the transaction as well as one or more data buffers. In some embodiments, the ICTE may include links to data buffers instead of the data buffers themselves. Usually a different ICT is used for each CPU. Thus, a multi CPU RAID controller can include multiple ICTs. In some cases a single table can be used and divided into different portions, each portion being associated with a particular CPU. Thus, when the disclosure below refers to multiple ICTs, these references may correspond to separate ICTs or to a separate portions of a single monolithic table.

When each CPU sends a new request (or initiates a transaction), it can send the request to the IOC along with an indication of the port the request is to be sent on. The CPU can also create (or populate) an ICTE for the new transaction in its ICT.

The SSP transport protocol of the SAS protocol provides that a TAG field be present in each frame. The TAG field is intended to identify a particular transaction (or IO) each frame belongs to and is required to be the same for all flames in a transaction.

When the IOC 111 is operating in accordance to the SSP protocol, it can use the TAG field to store the TIDs of the transactions the various frames are associated with. Thus, when sending a new IO request, the IOC can place the TID of the new request in the SAS command frame that describes the request. Thus, each storage device can receive a request with a TID and can return a response that includes the TID. Additional communications for the transaction (such as acknowledgements, data, etc.) can also include the TID. The IOC can extract the TIDs from communications received from the storage devices and then use them to obtain relevant information about the transactions these communications are part of. For example, the IOC can extract the ICT Index (ICTI 203) from the TID, and based on it access the ICT entry (ICTE 208) associated with the transaction the communication is associated with. The IOC can then process the incoming response based on the ICTE (for example, the IOC can determine from the ICTE which buffers to store the response). Alternatively, the IOC can merely send the received communications directly to a processor (i.e., by saving them in a queue generally associated with a particular processor), and let the processor perform further actions on them.

However, in either alternative, the IOC must be aware which processor the incoming communications are associated with. For example, if the IOC is to access the ICTE associated with a particular communication, it may need to know in which ICT that ICTE is located as there can be multiple ICTs associated with different processors. If the IOC is to send communications directly to a processor, it must again know which processor to send the communications to. As noted above, in prior art systems there is usually a one to one association between a processor and a port. Thus, the IOC can determine the relevant CPU based on the port the communications arrived at.

On the other hand, in embodiments of the invention, such a one to one CPU to port correlation need not exist. Thus, in some embodiments, the TID can be used to allow the IOC to determine which processor incoming communications are associated with. More specifically, a CPU identification can be inserted in the TID. When the IOC extracts the TID from a response received from a storage device, it can examine it to determine which processor it is associated with based on the CPU identification. Once the IOC determines which processor the response is associated with, it can determine how to process and/or where to send the received communications.

Figure 3:
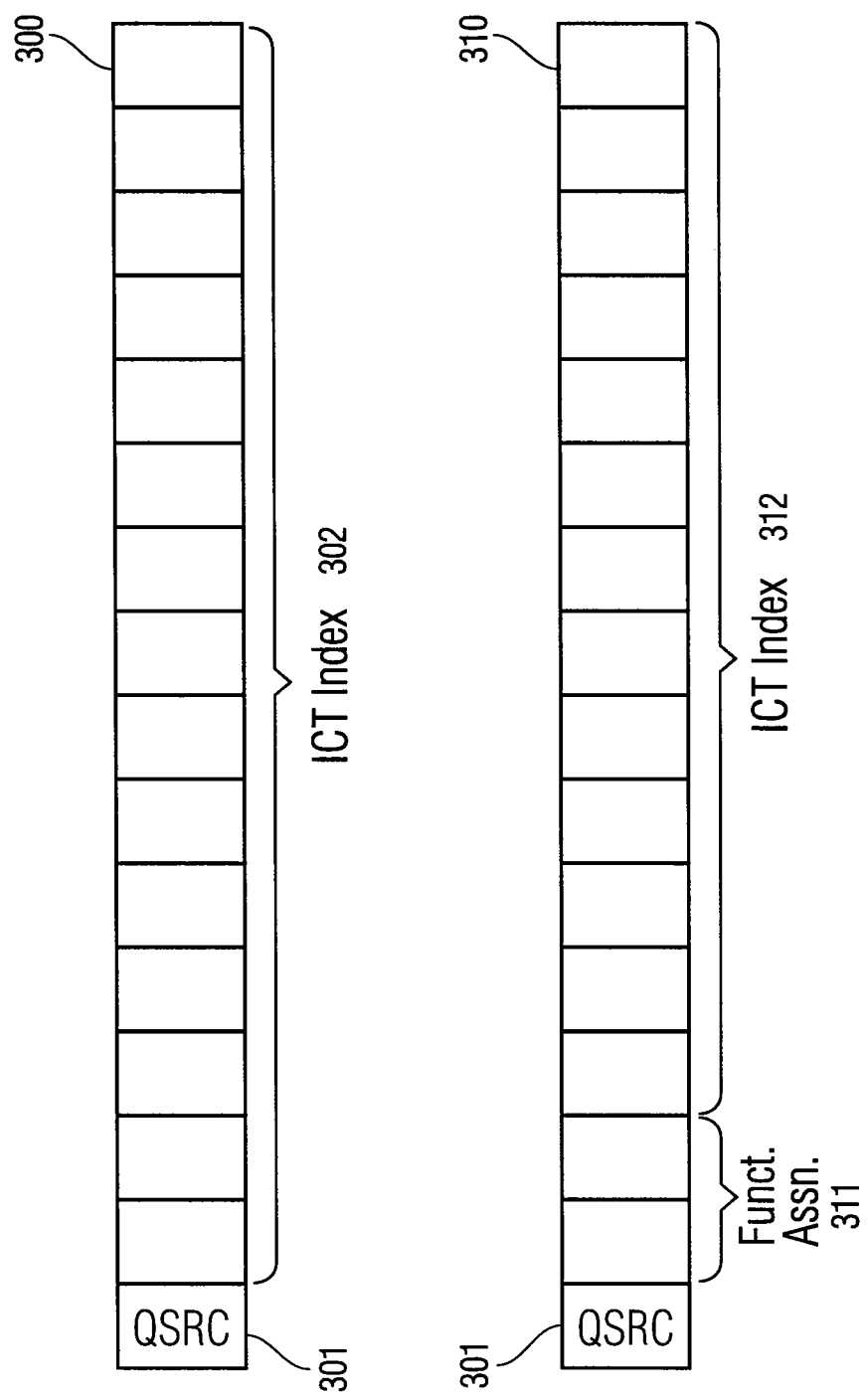
FIG. 3 is a diagram of an exemplary TID according to some embodiments of the invention.

FIG. 3 is a diagram of an exemplary TID according to some embodiments of the invention. TID 300 is a TID that may be used with prior art devices. The TID may comprise 16 bits, as shown. A first bit may be a queue source (QSRC) bit 301. The queue source bit indicates whether the TID is associated with a transaction initiated from an IRQ, or from an ARQ. An ARQ is a special input output request queue used for handling of exceptions. As shown, ICT index 302 takes up the other 15 bits.

TID 310 is a TID that may be used in some embodiments of the present invention. TID 310 also includes a QSRC bit 301. However, TID 310 further includes a function assignment field 311. The function assignment field identifies which function (or CPU) the TID is associated with. Thus, field 311 can be used by the IOC to determine which CPU incoming communications are associated with and to subsequently refer to the correct I/O context table (ICT) when processing incoming communications (or to send communications to the correct CPU).

Function assignment field 311 may have variable length based on the number of processors of the RAID controller. In the present example, there are 4 processors (see FIG. 1), therefore field 311 need only encompass 2 bits. In some embodiments, the size of the function assignment field can be such as to allow it to provide a unique value for all processors of the RAID controller. Thus, if the RAID controller had 8 processors, a three bit field 311 can be used.

TID 310 also comprises ICT index 312. The ICT index of a TID of an embodiment of the present invention may be shortened in comparison with that of existing systems, due to the presence of the function assignment field 311 in the TID. A shorter index may indicate that a lower number of ICT entries can be present in the ICT. Since each ICT entry is associated with a distinct transaction, a lower number of ICT entries can indicate that a lower number of distinct transactions can be processed at the same time by each individual processor. This may in turn result in a requirement that a lower maximum number of devices can be allowed to be attached to the IOC. While this may be considered a disadvantage in certain cases, it is usually a good trade off, because even the smaller ICT index field of embodiments of the present invention is considered to be of sufficient size for the great majority (if not all) applications. Thus, for example, in a four processor system, the shortened ICT index field allows for 8K entries in the ICT, which is considered more than sufficient.

The above discussed embodiments take advantage of the TAG field of the SSP transport protocol of a SAS network. More specifically, as known in the art, the SSP protocol allows for a TAG field that can be sent as part of a request. An SAS enabled target may provide a response to a request by ensuring that the TAG field of the request is copied in the response. Thus, the IOC can place the TID in the TAG field of outgoing requests, and be assured that all incoming communications associated with these requests include the same TAG field. Since each SSP frame includes a TAG field, each frame sent or received by the IOC for a particular transaction may include an identification of the CPU that initiated the transaction. Thus, the IOC can easily process frames based on the CPU they are associated with.

However, other protocols may not provide for a similar TAG field. For example, the SATA protocol does not provide for the TAG field discussed above. It should be noted that the SATA protocol does in fact include a TAG field of sorts, but SATA's TAG field is used for a different purpose than the SSP's TAG field, and is not suitable for storing TIDs. Thus, the STP transport protocol of the SAS protocol (i.e., the protocol intended to handle SATA enabled devices in a SAS network) does not include a TAG field where TIDs can be stored. Therefore, SATA, SAS/STP and other similar protocols may require a more involved method for determining the processor incoming communications are associated with. An example of such a method is discussed below in more detail.

While the STP protocol does not allow for placing TIDs in frames, it does provide that some frame information structures (or FISs—the counterpart to frames in the SATA and STP protocols) include an identification of the storage device the FISs originate from (or are sent to) as well as a TAG field. As noted above, the TAG field of the STP protocol FISs is different than the TAG field of the SSP protocol and does not allow for the storage of a TID value therein. Instead the TID field of the STP protocol is intended to identify the placement of the transaction in a local queue of the storage device. A SATA storage device may utilize a local queue that allows it to work on up to 32 different transactions simultaneously. If such a queue is utilized, some FISs sent through the STP protocol may include a TAG field that identifies the transaction with which the FIS is associated among the transactions in the storage device queue. Thus, the STP TAG field is not unique for all transactions being handled by an IOC but is only unique for the transactions being handled by a single storage device. Since the SATA protocol provides for a queue length of 32 transactions for each storage device, the STP TAG field is usually five bits long (thus allowing it to uniquely identify 32 transactions in the queue).

Not all SATA FISs include an identification of a device and a TAG field. SATA provides that some FISs (referred to as message FISs) may include device and TAG fields, while others (referred to as data FISs), need not include these fields. A storage device may transmit one or more message FISs and a plurality of data FISs and the data FISs may be assumed to be associated with the device identification and TAG fields of the immediately preceding message FIS.

According to some embodiments, the IOC can keep track of the device identification and TAG fields of FISs it sends and receives from SATA devices, in order to uniquely identify the corresponding transactions of received FISs. The IOC can then match these transactions with previously stored TIDs. The TIDs can be of the format discussed above in connection with the SSP protocol, and can include a processor identification. Thus, the IOC can match incoming FISs with their respective TIDs, and determine (based on the TIDS) which processor the incoming FISs are associated with. Consequently, the IOC can correctly process the incoming FISs by either sending them to the correct processor or storing them in the correct ICTE. Furthermore, in some embodiments, the IOC can use the locally stored TIDs to construct SSP frames from the bodies of incoming STP FISs. The IOC can then send the constructed SSP frames to their associated processor. Thus, the IOC can allow the processor (or driver executing thereon) to operate under the assumption that all communication is performed using the SAS/SSP protocol and ignore the existence of SATA storage devices. This may simplify and speed up the driver software as well as allow for greater compatibility.

Figure 4:
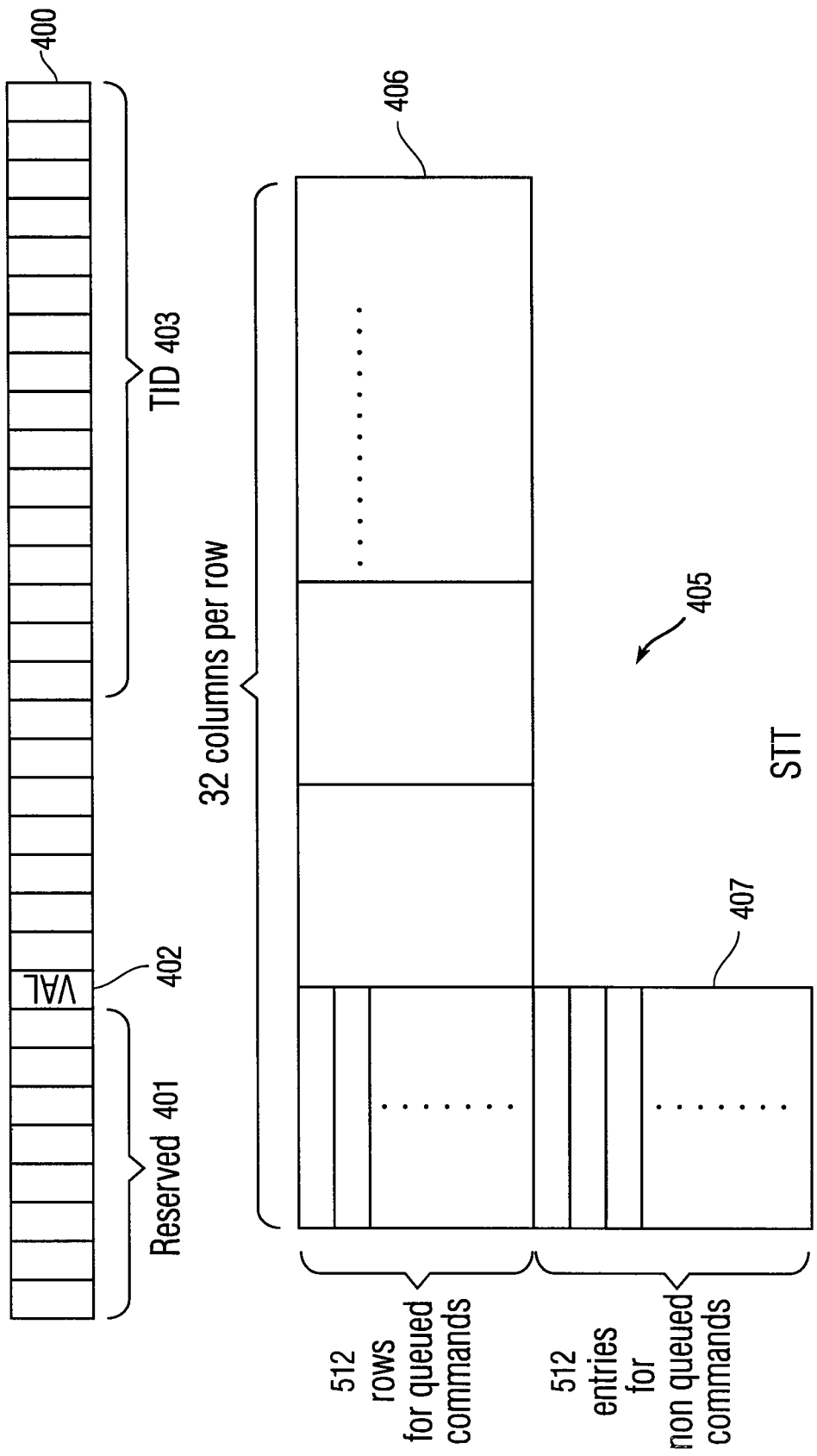
FIG. 4 is a diagram of an exemplary STT and its entries according to some embodiments of the invention.

Embodiments of the present invention may track TIDs in STP communications utilizing two tables referred to as SATA TID table (STT) and active tag table (ATT). FIG. 4 shows an exemplary STT and its entries. Word 400 is an example entry in an STT. It includes a reserved field 401, a valid bit 402 and a TID field 403. The valid field indicates whether the entry is valid (i.e., whether there exists a current transaction associated with the entry, as opposed to having the entry merely indicate an "empty space" in the table). The TID field includes a TID similar to the one discussed above in connection with the SSP protocol.

An exemplary STT is shown in FIG. 4 as table 405. Table 405 includes two different portions. A top portion 406 is intended to handle devices that queue their commands (i.e., devices that can handle up to 32 different transactions at a time), and a lower portion 407 is intended to handle devices that can only handle a single transaction at a time. Each portion has 512 rows. Each row is associated with a SATA device. Thus, the table can handle 512 devices of each type. Other embodiments may feature tables of different sizes. Each entry in the table may include data defining the status of a transaction. The data may be, for example, of the format of word 400.

The upper portion of the table is two dimensional. Each row includes 32 columns. Thus, each row includes 32 entries. Each entry in a given row of the upper portion can be associated with a particular transaction queued with the device that is associated with the given row. Thus each row in the upper portion may represent an entire queue of a respective SATA storage device.

When a CPU initiates a new transaction it may generate a TID for the transaction. As discussed above in connection with FIG. 3, the TID can include a CPU identifier identifying the CPU initiating the transaction. The CPU can then send a command to the IOC to initiate the transaction. The command may include a target storage device identification as well as the TID. The IOC can generate an STT entry (such as entry 400) associated with the transaction and save the TID in the STT entry. The IOC can then save the STT entry in a specific cell in the STT table. The cell can be associated with the target device and the position the STT entry will take in the queue of the target device. The position in the queue may be determined based on the presence of other valid entries in the row associated with the target device and known predefined behavior of the target device when queuing a new entry. If the target device is one that does not provide for queuing, the entry can be saved in the lower portion of the table without concern for a position within a row.

Thus the STT table may save various entries indicating the status of pending transactions in positions which indicate the storage device associated with each transaction as well as the position of each transaction in that storage device's local queue. The STT table can be stored, for example, in a memory for the IOC 111, or the memory 131 of the RAID controller 104.

Figure 5:
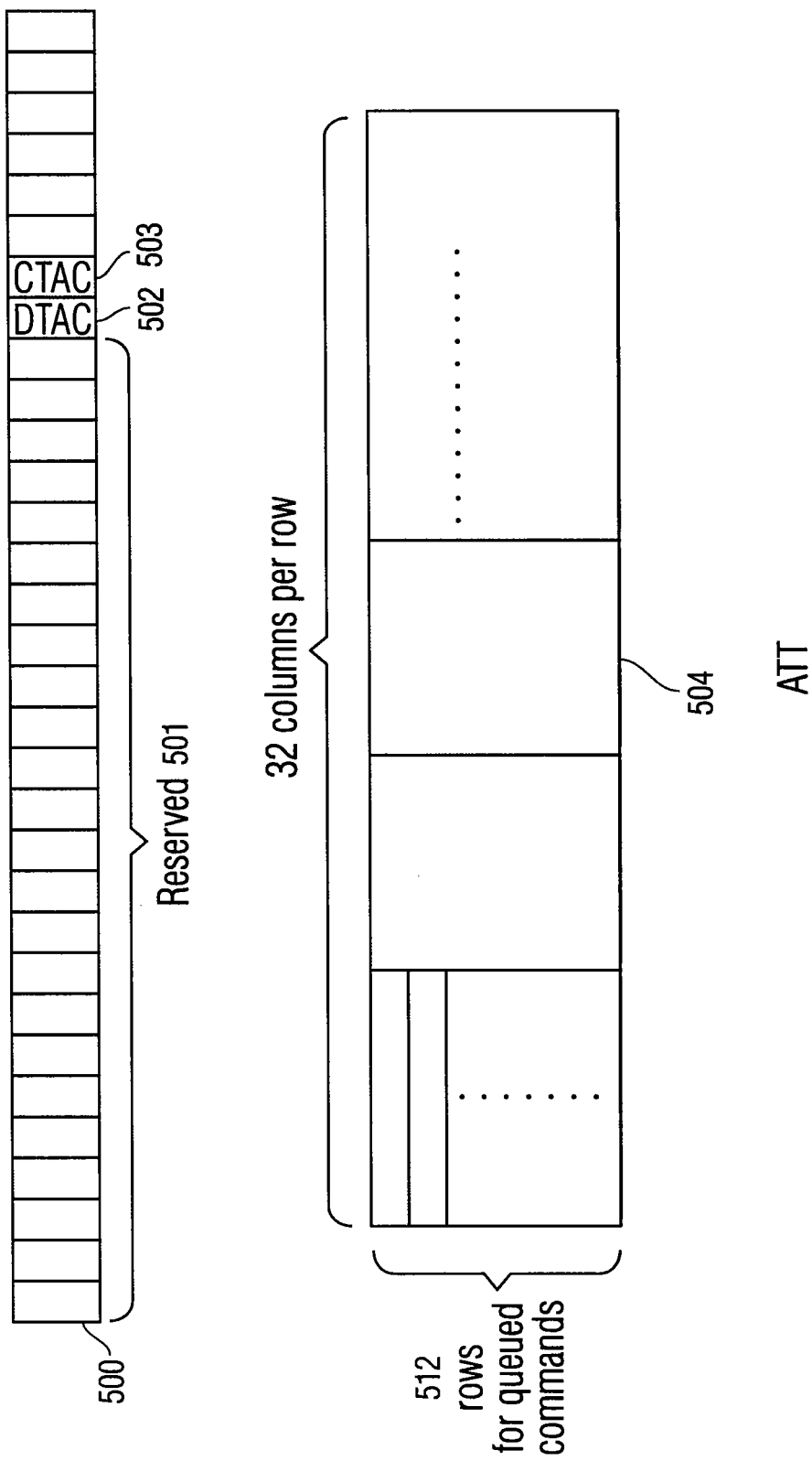
FIG. 5 is a diagram of an exemplary ATT and its entries according to some embodiments of the invention.

FIG. 5 is a diagram showing an exemplary ATT according to some embodiments. Element 500 is a single entry in the ATT table. The entry 500 may include a reserved field 501, a Data TAG Active (DTAC) field 502 and a Command TAG Active (CTAG) field 503. ATT 504 can include 512 rows, each associated with a particular storage device. Again the number of rows may differ, but some embodiments require that this number is the same as the number of rows of the upper portion of the STT. Each row may include 32 entries, each entry again being associated with a transaction in a local queue of a particular device (the device being identified by the row).

Each entry in ATT 504 can indicate the status of a transaction associated with a particular device and queue position. Each entry of ATT 504 can also be associated with a corresponding entry in the upper portion of STT 406. In some embodiments, entries in the two table that have the same positions (i.e., the same row and column numbers) can be associated with each other. Thus, a state of a transaction can be described by a combination of an STT and an ATT entry occupying the same relative positions in their respective tables.

When an initial command initiating a transaction is first sent out, the CTAC field 502 of the ATT entry associated with the transaction is set. A set CTAC field indicates that a command is sent out but has not been acknowledged. When an acknowledgement of the command is received from the storage device, the CTAC field is cleared. Some embodiments provide that no other new transactions are to be sent to a device for which a transaction still has its CTAC field set. This may prevent uncertainty over the queue positioning of different transactions associated with the same device.

After the initial command is acknowledged, the storage device may execute the command. This may include storing or reading data. If data is to be stored, the IOC may send a message FIS followed by a plurality of data FISs to the device after receiving acknowledgement. As a result of executing the command, the storage device, may send back to the IOC a message FIS. The message FIS may indicate that data was received, that data has been stored, or that data to be read is forthcoming.

The IOC may examine the message FIS to determine a source storage device and a TAG field for the received message FIS. Based on this information, the IOC can select an entry in ATT 504 which is associated with the transaction of the message FIS. The IOC may then select an entry in STT table 405 that has the same relative position as the selected entry in the ATT table. The IOC can then extract a TID associated with the transaction of the received message FIS from the selected STT entry. Based on the TID, the IOC can determine which processor the message FIS is associated with and process it accordingly. For example, the IOC may construct a SAS frame based on the message FIS and the discovered TID and send the SAS frame to the appropriate processor.

In some cases one or more data FISs may follow a message FIS. If the IOC receives a message FIS that indicates that data FISs will follow, the IOC may save the location of the entry associated with the message FIS and set the DTAC field for that entry. While the DTAC field is set, the IOC may treat all FISs received at the port at which the message FIS was received as data FISs. The IOC may process data FISs based on the entry associated with the message FIS. Thus, the data FISs will get the same TID as the message FIS that preceded them. That may be necessary because, as discussed above, data FISs may not have an indication of the source storage device or a TAG field in them. Once the incoming data FISs end, the IOC may reset the DTAC flag and continue ordinary operation. The IOC may determine when the data FISs end, by reading information which indicates the overall length of data that follows.

Similar to the STT, the ATT may be stored at local IOC memory or at the RAID controller memory. In some embodiments, the ATT may be a hardware implemented table. In other words, the ATT may be stored in registers in the IOC controller and connected to dedicated table lookup hardware. This may provide for very fast lookup of entries in table 504. The STT entry associated with an ATT entry may be found using context addressable memory (CAM). This may improve efficiency as the use of a hardware implemented ATT may improve speed of lookup, while the use of a different STT that is not hardware implemented (but is accessible using CAM) can ensure that the hardware implemented ATT does not need to store too much data thus reducing the cost of the hardware implemented ATT. In some embodiments both tables may be stored in ordinary memory. In some embodiments the two tables may be combined in a single table.

Figure 6:
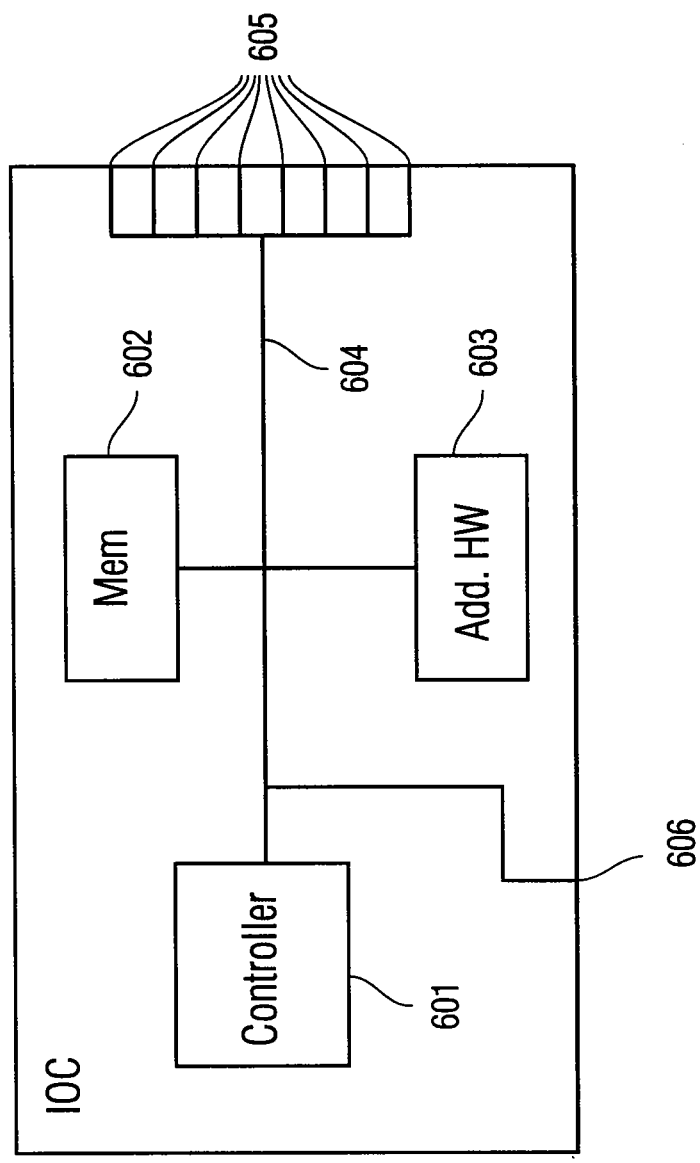
FIG. 6 is a diagram showing an exemplary IOC according to some embodiments of the present invention.

FIG. 6 is a diagram showing an exemplary IOC according to some embodiments of the present invention. The IOC 111 can include a controller 601 and memory 602. The controller can be a generally programmable controller or processor. However, controller 601 should be distinguished from CPUs 105-108 of RAID controller 104. Similarly, memory 602 is different than memory 103 of RAID controller 104. Memory 602 may include volatile or non volatile memory, such as RAM, FLASH, ROM, EPROM, etc. Memory 602 may store instructions for execution by controller 601 as well as various data, such as, for example the STT table. The instructions may form IOC firmware. Additional hardware 603 may also be present. The additional hardware may comprise various hardware used for data processing not performed by the controller. For example, the additional hardware may comprise a hardware implemented ATT. The additional hardware may be application specific hardware. Controller 601, memory 602 and additional hardware 603 may be connected through internal bus 604 (to be distinguished from RAID controller bus 112). The internal bus can also be connected to one or more network PHYs 605 (these may be similar to PHYs 114-121 of FIG. 1) that connect the IOC to one or more SAS networks. The internal bus may also be connected to host connection 606 that connect the IOC to the rest of RAID controller 104 through RAID controller bus 112. The IOC can also include additional hardware, not shown in FIG. 6.

While the present invention was described in terms of RAID controllers, and SAS networks (utilizing the SSP or STP transport protocols) it is not thus limited. It may apply to other similar devices and/or similar networks.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A Redundant Array of Independent Disks (RAID) controller comprising:
   a plurality of RAID controller Central Processing Units (CPUs); and
   an Input/Output Controller (IOC) connected to the plurality of CPUs, the IOC comprising a plurality of ports, each port being configured for connection with a respective storage device network of a plurality of storage device networks;
   wherein at least one CPU of the plurality of CPUs is configured to send a first request to perform a first storage device related operation to the IOC and a second request to perform a second storage device related operation to the IOC, the first request specifying a first port of the plurality of ports and the second request specifying a second port of the plurality of ports; and
   wherein the IOC is configured to generate a first network request and a second network request based respectively on the first request and the second request received from the CPU and send the first network request and the second network request through the first and second ports, respectively, to a first storage device network and a second storage device network of the plurality of storage device networks, respectively.

2. The RAID controller of claim 1, wherein the IOC is further configured to:
   receive a response from one of the plurality of storage device networks in response to the first network request from the IOC, the response being associated with the first request sent by the CPU,
   determine, at least partially based on the response, which CPU sent the first request that the response is associated with; and
   forward at least part of the response to the CPU that sent the first request.

3. The RAID controller of claim 2, wherein the CPU is further configured to generate a transaction ID associated with the first request sent by the CPU to the IOC, the transaction ID including a CPU identification associated with the CPU.

4. The RAID controller of claim 3, wherein:
   the IOC is configured to include the transaction ID in the first request;
   the response includes the transaction ID that was included in the first request; and the determining of which CPU sent the first request further comprises
extracting the transaction ID from the received response,
obtaining the CPU identification from the transaction ID, and
determining which CPU sent the first request based on the obtained CPU identification.

5. The RAID controller of claim 3, wherein:
the IOC is configured to store the transaction ID locally along with transaction identification information associated with the first request;
the response includes transaction identification information; and
the determining of which CPU sent the first request further comprises
matching the transaction identification information included by the response with the transaction identification information that is stored locally with the transaction ID,
selecting the transaction ID based on the matched transaction identification information,
obtaining the CPU identification from the transaction ID, and
determining which CPU sent the first request based on the obtained CPU identification.

6. The RAID controller of claim 5, wherein the transaction ID is stored in a table and the transaction identification information is the table index of the stored transaction ID.

7. The RAID controller of claim 6, wherein the transaction identification information includes a storage device number indicating a storage device that is a target for the first request, and a queue number indicating a position in a queue of the target storage device with which the first request is associated, and the storage device number and the queue number are used as an index of the table.

8. The RAID controller of claim 7, wherein the table includes a first table and a second table, the first table being hardware implemented and used for matching the transaction identification information, the second table being connected to the first table through context addressable memory and being used for storing the transaction ID.

9. The RAID controller of claim 1, wherein at least one of the plurality of storage device networks is a Serial-Attached Small Computer System Interface (SAS) network.

10. The RAID controller of claim 9, wherein at least one of the plurality of storage device networks is a SAS network utilizing the Serial SCSI Protocol (SSP) transport protocol.

11. The RAID controller of claim 9, wherein at least one of the plurality of storage device networks is a SAS network utilizing the Serial ATA Tunneling Protocol (STP) transport protocol.

12. A storage area network comprising the RAID controller of claim 1.

13. An Input/Output Controller (IOC) comprising:
a controller;
a local memory;
application specific hardware; and
a plurality of ports each port being configured for connection with a respective storage device network of a plurality of storage device networks,
the controller and application specific hardware being configured to:
receive from a CPU of a plurality of CPUs connected to the IOC a first request to perform a storage device related operation to the IOC and a second request to perform a second storage device related operation to the IOC, the first request specifying a first port of the plurality of ports and the second request specifying a second port of the plurality of ports
generate a first network request and a second network request based respectively on the first request and the second request received from the CPU, and
send the first network request and the second network request through the first and second ports, respectively, to a first storage device network and a second storage device network of the plurality of storage device networks, respectively.

14. The IOC of claim 13, wherein the controller and application specific hardware are further configured to:
receive a response from one of the plurality of storage device networks in response to the first network request from the IOC, the response being associated with the first request sent by the CPU,
determine, at least partially based on the response, which CPU sent the first request that the response is associated with; and
forward at least part of the response to the CPU that sent the first request.

15. The IOC of claim 14, wherein the controller and application specific hardware are further configured to receive a transaction ID as part of the first request, the transaction ID being associated with the request and including a CPU identification associated with the CPU.

16. The IOC controller of claim 15, wherein:
the controller and application specific hardware are further configured to include the transaction ID in the first network request;
the response includes the transaction ID that was included in the first network request; and
the determining of which CPU sent the first request further comprises
extracting the transaction ID from the received response,
obtaining the CPU identification from the transaction ID, and
determining which CPU sent the first request based on the obtained CPU identification.

17. The IOC of claim 15, wherein:
the controller and application specific hardware are configured to store the transaction ID locally along with transaction identification information associated with the first request;
the response includes transaction identification information; and
the determining of which CPU sent the first request further comprises
matching the transaction identification information included by the response with the transaction identification information that is stored locally with the transaction ID,
selecting the transaction ID based on the matched transaction identification information,
obtaining the CPU identification from the transaction ID, and
determining which CPU sent the first request based on the obtained CPU identification.

18. The IOC of claim 17, wherein the transaction ID is stored in a table and the transaction identification information is the table index of the stored transaction ID.

19. The IOC of claim 18, wherein the transaction identification information includes a storage device number indicating a storage device that is a target for the first request, and a queue number indicating a position in a queue of the target storage device with which the first request is associated, and the storage device number and the queue number are used as an index of the table.

20. The IOC of claim 19, wherein the table includes a first table and a second table, the first table being implemented in the application specific hardware and used for matching the transaction identification information, the second table being stored in the local memory, connected to the first table through context addressable memory and used for storing the transaction ID.

21. The IOC of claim 13, wherein at least one of the plurality of storage device networks is a Serial-Attached Small Computer System Interface (SAS) network.

22. The IOC of claim 21, wherein at least one of the plurality of storage device networks is a SAS network utilizing the Serial SCSI Protocol (SSP) transport protocol.

23. The IOC of claim 21, wherein at least one of the plurality of storage device networks is a SAS network utilizing the Serial ATA Tunneling Protocol (STP) transport protocol.

24. A method for performing storage network processing in a Redundant Array of Independent Disks (RAID) controller comprising:
provided a plurality of CPUs in the RAID controller;
providing an IOC in the RAID controller; and
providing a plurality of ports at the IOC, each port being configured for connection with a respective storage device network of a plurality of storage device networks;
wherein a CPU is configured to send two requests to storage devices through the IOC, each request specifying a different port of the plurality of ports, and
wherein the IOC is configured to generate two network requests based respectively on the two requests and send each of the two network requests to a different storage device network of the plurality of storage device networks.

25. The method of claim 24, further comprising:
wherein a first CPU of the plurality of CPUs is configured to send a first request to a first storage device through a first port through the IOC;
the method further comprising:
receiving a first response by the IOC through the first port, the first response being associated with the first request sent by the first CPU;
determining, at least partially based on the first response, the CPU which sent the first request by the IOC; and
sending at least part of the first response to the CPU that sent the first request.

26. The method of claim 25, further comprising generating a transaction ID by the first CPU, the transaction ID including a CPU identifier associated with the first CPU and embedding the transaction ID in the first request, wherein:
the received first response includes the transaction ID; and
the determining of the CPU which sent the first request further includes
extracting the transaction ID from the first response,
extracting the CPU identifier from the transaction ID, and
determining the CPU which sent the first request by referring to the CPU identifier.

27. The method of claim 25, further comprising storing a transaction ID locally along with transaction identification information associated with the first request, wherein:
the first response includes transaction identification information; and
the determining of which CPU sent the first request further comprises
matching the transaction identification information included by the first response with the transaction identification information that is stored locally with the transaction ID,
selecting the transaction ID based on the matched transaction identification information,
obtaining a CPU identification from the transaction ID, and
determining which CPU sent the first request based on the obtained CPU identification.

28. The method of claim 27, wherein the transaction ID is stored in a table and the transaction identification information is the table index of the stored transaction ID.

29. The method of claim 28, wherein the transaction identification information includes a storage device number indicating a storage device that is a target for the first request, and a queue number indicating a position in a queue of the target storage device with which the first request is associated, and the storage device number and the queue number are used as an index of the table.

30. The method of claim 29, wherein the table includes a first table and a second table, the first table being implemented in the application specific hardware and used for matching the transaction identification information, the second table being stored in the local memory, connected to the first table through context addressable memory and used for storing the transaction ID.

* * * * *